United States Patent Office 2,824,821
Patented Feb. 25, 1958

2,824,821

ADHESIVE COMPOSITION AND PROCESS OF BONDING THEREWITH

Günther Nischk, Leverkusen-Wiesdorf, and Karl Erwin Müller and Otto Bayer, Leverkusen-Bayerwerk, Germany, assignors to Farbenfabriken Bayer Aktiengesellschaft, Leverkusen, Germany, a corporation of Germany No Drawing. Application February 25, 1953
Serial No. 338,908

Claims priority, application Germany March 1, 1952

11 Claims. (Cl. 154—140)

The present invention relates to a new process of bonding materials, especially metals.

In copending application Ser. No. 278,508, filed April 25, 1952, we have described unsaturated, carboxyl groups containing polyesters which are obtained by chemical addition of anhydrides of unsaturated carboxylic acids to saturated polyesters having hydroxyl end groups. The said high molecular weight, unsaturated polyesters containing hydroxyl groups can be copolymerized with monomeric vinyl compounds, such as styrene, in the presence of peroxides and may be used as cast resins.

In accordance with the present invention we have surprisingly found that materials of all kind, especially metals, can successfully be bonded by causing mixtures of the above described polymerizable compounds of which one component consists of a carboxyl group containing, unsaturated condensation or polymerization product substantially consisting of ester groups and the other component of copolymerizable, unsaturated vinyl compounds, to copolymerize at the connecting seam. The new process is particularly suitable for bonding metals, cast resins, glass etc.; an extraordinarily good bonding effect is achieved at temperatures up to 100° C. without loosening of the bonded surfaces being possible.

It is, of course, within the scope of the present invention to use linear, unsaturated polyesters containing free carboxyl end groups. Such linear, unsaturated carboxyl groups containing polyesters can be prepared according to conventional methods by condensation of excess quantities of dicarboxylic acids and maleic acid by thermal esterification.

The addition of unsaturated anhydrides of carboxylic acids is not restricted to branched polyesters containing hydroxyl groups. As a matter of fact, the said unsaturated anhydrides can also be added to other high molecular weight compounds containing hydroxyl groups, such as partly or completely saponified polymers or copolymers of vinyl acetate, and may be employed as adhesives after admixing vinyl compounds.

By incoporation of tertiary or secondary amines into the said unsaturated polyesters containing carboxyl groups (compare copending applications Ser. Nos. 313,591, filed October 7, 1952, and 320,342, filed November 13, 1952) the bonding process can be carried out already at room temperature or slightly elevated temperatures.

In general, the surfaces are bonded by dissolving peroxides in a mixture of unsaturated, carboxyl groups containing high molecular weight condensation or polymerization products and monomeric vinyl compounds, applying this polymerizable mixture in a thin layer, for instance by brushing, on the roughened surfaces, and hardening with the application of slight pressure at temperatures at which decomposition of the peroxides into radicals occurs.

The invention is further illustrated by the following examples without being restricted thereto; the parts being by weight.

Example 1

100 parts of a branched polyester prepared from 2 mols of adipic acid, 0.5 mol of phthalic anhydride and 4 mols of a triol (for instance hexanetriol) by thermal esterification and having the hydroxyl number 230 and the acid number 2.1 are heated to 120° C. and 38 parts of maleic anhydride are added thereto. The temperature is kept at 120–125° C. for 1 hour and, thereafter, 0.1 part of hydroquinone is added. After the temperature has dropped to 100° C. 59 parts of styrene are run in and the solution is cooled to room temperature.

1% of benzoyl peroxide is stirred into the copolymerizable solution. This solution may be used to bond metals, plastics etc. at 100° C. by heating the previously slightly roughened surfaces, which have been provided with a thin film and immediately superimposed, at 100° C. for 10 minutes.

The copolymerizable solution has an acid number of about 110–115.

TENSILE STRENGTH AT 20° C.

|  | Aluminum, kg./cm.$^2$ | Overlapping, cm.$^2$ | Calculated on 1 cm.$^2$ |
|---|---|---|---|
| (1) | 282 | 1.2 | 236 |
| (2) | 333 | 1.4 | 238 |
| (3) | 283 | 1.2 | 236 |
| (4) | 270 | 1.16 | 233 |
| (5) | 305 | 1.25 | 244 |

AT 60° C.

| (1) | 260 | 1.38 | 189 |
|---|---|---|---|
| (2) | 123 | 0.65 | 190 |
| (3) | 264 | 1.5 | 176 |
| (4) | 222 | 1.1 | 202 |
| (5) | 212 | 1.3 | 163 |

AT 80° C.

| (1) | 162 | 1.18 | 137 |
|---|---|---|---|
| (2) | 203 | 1.35 | 150 |
| (3) | 167 | 1.1 | 152 |
| (4) | 125 | 0.85 | 147 |
| (5) | 190 | 1.2 | 159 |

AT 100° C.

| (1) | 143 | 1.4 | 102 |
|---|---|---|---|
| (2) | 106 | 1.1 | 97 |
| (3) | 120 | 1.2 | 100 |
| (4) | 140 | 1.2 | 117 |
| (5) | 135 | 1.25 | 108 |

Example 2

A branched polyester having the acid number 1.8 and the hydroxyl number 230 is prepared by thermal esterification of 365 parts of adipic acid, 74 parts of phthalic anhydride, 480 parts of hexanetriol and 5 parts of p-(N-diphenyl)-diethanolamine. After cooling to 125° C. 100 parts of this polyester are reacted with 35 parts of maleic anhydride and well stirred at 125° C. for 1 hour. After the addition reaction is complete 0.1 part of hydroquinone is added, the solution is cooled to 100° C. and 59 parts of styrene are introduced.

After addition of 1% of benzoyl peroxide the slightly roughened metal surfaces, coated with a thin layer, are superposed under pressure and heated to 50° C. for 20 minutes.

The properties as to tear resistance correspond to the samples of Example 1. The solution of peroxide and polyester is stable at room temperature for about 2 hours.

We claim:
1. A process of bonding materials which comprises reacting under polymerization conditions a mixture consisting essentially of (1) a compound obtained by reacting anhydrides of alpha, beta ethylenically unsaturated dicarboxylic acids with polyesters devoid of aliphatic carbon to carbon unsaturation and having free hydroxyl groups to produce polyesters with end groups consisting of half-ester groups of alpha, beta ethylenically unsaturated dicarboxylic acids and (2) at least one monomeric vinyl compound, at the connecting surfaces.

2. A process of bonding materials which comprises reacting under polymerization conditions a mixture consisting essentially of (1) a compound obtained by reacting anhydrides of alpha, beta ethylenically unsaturated dicarboxylic acids with polyesters having free hydroxyl groups and containing nitrogen groups selected from the group consisting of secondary and tertiary nitrogen groups but devoid of aliphatic carbon to carbon unsaturation to produce polyesters with end groups consisting of half-ester groups of alpha, beta ethylenically unsaturated dicarboxylic acids and (2) at least one monomeric vinyl compound at the connecting surfaces.

3. A process of bonding materials as claimed in claim 1 which comprises carrying out the reaction in the presence of peroxides.

4. A process of bonding materials as claimed in claim 2, which comprises carrying out the reaction in the presence of peroxides.

5. A process of bonding materials according to the process of claim 1, wherein the anhydride used for producing component (1) is maleic acid anhydride.

6. A process of bonding materials according to the process of claim 2, wherein the anhydride used for producing component (1) is maleic acid anhydride.

7. A process as claimed in claim 1, wherein the materials to be bonded with each other are produced from light metals.

8. An adhesive composition obtained by reacting under polymerization conditions a mixture consisting essentially of (1) a compound obtained by reacting anhydrides of alpha, beta ethylenically unsaturated dicarboxylic acids with polyesters having free hydroxyl groups but devoid of aliphatic carbon to carbon unsaturation to produce polyesters with free end groups consisting of half-ester groups of alpha, beta ethylenically unsaturated dicarboxylic acids and (2) at least one monomeric vinyl compound.

9. An adhesive composition obtained by reacting under polymerization conditions a mixture consisting essentially of (1) a compound obtained by reacting anhydrides of alpha, beta ethylenically unsaturated dicarboxylic acids with polyesters having free hydroxyl groups and containing nitrogen groups selected from the group consisting of secondary and tertiary nitrogen groups but devoid of aliphatic carbon to carbon unsaturation to produce polyesters with free end groups consisting of half-ester groups of alpha, beta ethylenically unsaturated dicarboxylic acids and (2) at least one monomeric vinyl compound.

10. An adhesive composition of claim 8 wherein the anhydride used for producing component (1) is maleic acid anhydride.

11. An adhesive composition of claim 9 wherein the anhydride used for producing component (1) is maleic acid anhydride.

References Cited in the file of this patent

UNITED STATES PATENTS

| | | |
|---|---|---|
| 2,318,959 | Muskat et al. | May 11, 1943 |
| 2,332,460 | Muskat et al. | Oct. 19, 1943 |
| 2,336,985 | Freund | Dec. 14, 1943 |
| 2,443,741 | Kropa | June 22, 1948 |
| 2,480,928 | Hurdis | Sept. 6, 1949 |
| 2,491,409 | Kropa | Dec. 13, 1949 |

FOREIGN PATENTS

| | | |
|---|---|---|
| 540,169 | Great Britain | Oct. 8, 1941 |
| 547,328 | Great Britain | Aug. 24, 1942 |
| 630,022 | Great Britain | Oct. 4, 1949 |